UNITED STATES PATENT OFFICE.

WALTER S. ROCKEY AND HILLIARY ELDRIDGE, OF NEW YORK, N. Y., ASSIGNORS TO METALLURGICAL RESEARCH COMPANY, A CORPORATION OF ARIZONA.

PROCESS OF REMELTING AND REFINING OLD OR SCRAP COPPER ALLOY.

1,019,524.

Specification of Letters Patent. Patented Mar. 5, 1912.

No Drawing. Application filed February 2, 1911. Serial No. 606,160.

*To all whom it may concern:*

Be it known that we, WALTER S. ROCKEY and HILLIARY ELDRIDGE, citizens of the United States, both residing at New York, in the county of New York and State of New York, have invented certain new and useful Improvements in Processes of Remelting and Refining Old or Scrap Copper Alloy, of which the following is a full, clear, and exact specification.

Our invention relates to the art of remelting and refining old or scrap copper alloy.

The object of our invention is to prevent the loss by volatilization and oxidation of the metals that form the alloy during fusion and to produce a copper alloy of a higher degree of purity than has been heretofore attained by the elimination of the impurities from the old or scrap copper alloy.

In carrying out our process of remelting and refining alloys, we first reduce to a fluid condition by heat, a suitable flux, preferably boron trioxid or one containing boron trioxid which has the property of dissolving or holding in suspension the oxids, and other metallic impurities of the metals which form the alloy, and also serves the purpose of protecting during fusion the said copper alloys from oxidation and volatilization. Having thus prepared a bath of this flux as described, we submerge beneath said flux the old or scrap copper alloy which fuses beneath said flux. During said fusing operation the flux dissolves or holds in suspension the metallic impurities of the said copper alloy which are then reduced to the metallic state by the reducing action of carbon or its equivalent which is added to the flux. After this reduction is consummated, the metal is drawn off or poured out of the fusing receptacle and cast as may be desired.

Having thus described our invention what we claim is:

1. The process of refining old or scrap copper alloy consisting in first reducing to a fluid condition by heat a flux containing boron trioxid, and then submerging beneath said flux the old or scrap copper alloy and fusing same beneath said flux causing said flux to dissolve or hold in suspension the metallic impurities contained in said scrap metal thus purifying the alloy metal beneath the surface of said flux, and then adding carbon to the flux to further reduce the metallic impurities contained in said flux.

2. The process of refining old or scrap copper alloy consisting in first reducing to a flued condition by heat a flux of boron trioxid, and then submerging beneath said flux the old or scrap copper alloy and fusing same beneath said flux causing said flux to dissolve or hold in suspension the metallic impurities contained in said scrap metal thus purifying the alloy metal beneath the surface of said flux, and then adding carbon to the flux to further reduce the metallic impurities contained in said flux.

3. The process of refining old or scrap copper alloy consisting in first reducing to a fluid condition by heat a suitable flux having the quality of dissolving or holding in suspension the oxids, and other metallic impurities contained by the metals which form the alloy, then submerging beneath said flux the old or scrap copper alloy and fusing same beneath said flux causing said flux to dissolve or hold in suspension the metallic impurities contained in said scrap metal thus purifying the alloy metal beneath the surface of said flux, and then adding carbon to further reduce the metallic impurities contained in said flux.

In testimony whereof, we affix our signatures, in presence of two witnesses:

WALTER S. ROCKEY.
HILLIARY ELDRIDGE.

Witnesses:
G. F. QUACKINBUSH,
JOSEPH MATTES.